March 14, 1944.    R. KOCH    2,344,044
AIRCRAFT WING
Filed March 15, 1941
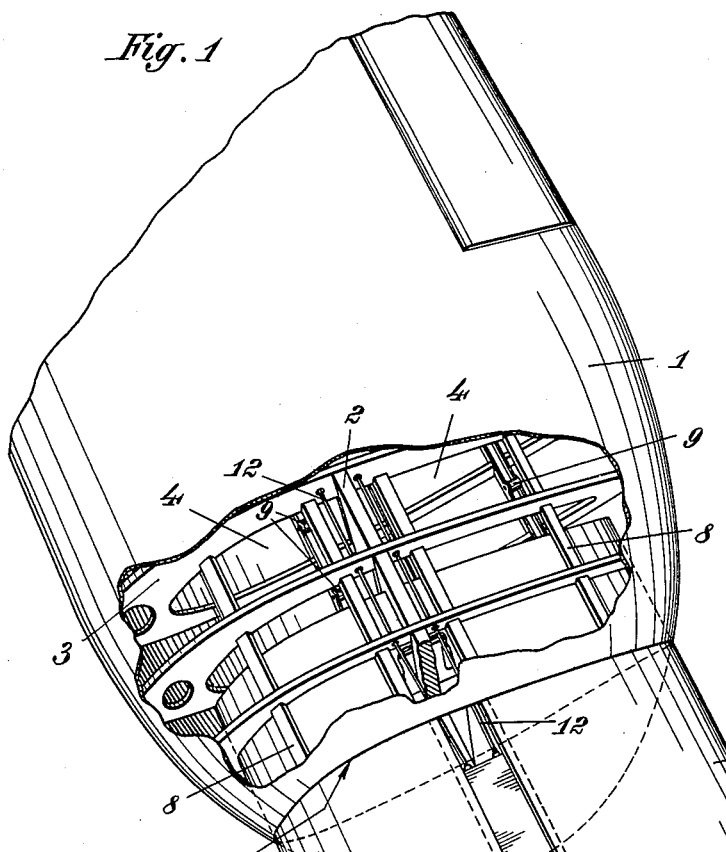
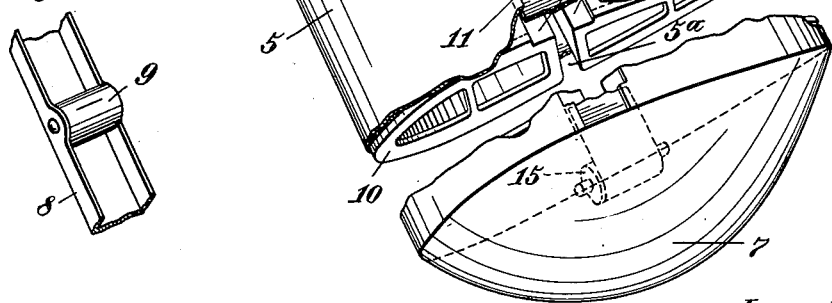
Inventor:
Rudolf Koch
BY
Richards & Geier
ATTORNEYS Patented Mar. 14, 1944

2,344,044

UNITED STATES PATENT OFFICE 2,344,044

AIRCRAFT WING

Rudolf Koch, Berlin-Grunau, Germany; vested in the Alien Property Custodian

Application March 15, 1941, Serial No. 383,475
In Germany April 26, 1940

1 Claim. (Cl. 244—43)

This invention relates to an aircraft wing.

For reasons of speed, airplanes are frequently provided with wings of small thickness and span, which involve a high landing speed and require a long runway. In order to overcome the disadvantages connected with this type of aircraft it has been proposed to increase the lift in landing and taking off by rendering the wings extensible transversely to the direction of flight.

According to one of these proposals the wing is equipped with two longitudinal spars and three extensions rigidly interconnected by the wing tip cap, which can be inwardly and outwardly moved transversely to the direction of flight and each of which resists bending and twisting forces, the first extension being positioned before the front spar, the second between the two spars and the third in the rear of the back spar.

In a wing of this construction the spars, the ribs and the stringers running parallel to the spars and connecting the ribs form direct bearings and guides for the wing extensions which are difficult to move in view of the great frictional forces concerned and tend moreover to seize and jamb.

The invention eliminates these troubles by providing the stringers running parallel to the spars with rollers which act as bearings and guides for the movable wing extensions and which are arranged above and below them, particularly near the spars and within range of the leading and trailing edges of the wing.

The advantages afforded by the invention consist in insuring good guiding of the wing extensions without any appreciable increase in weight and also an easily movable arrangement thereof, since the rollers themselves have little weight and the stringers bearing them can serve also for another purpose. The rollers safety take up the static and dynamic forces developing in flight and through the stringers conduct them to the supporting structure of the wing, the roller bearings located near the spars particularly transmitting the bending forces and those disposed within range of the nose and trailing edge of the wing the twisting forces and front compression stresses. The extension surfaces while subjected to the action of the aerodynamic forces can be moved in and out without any considerable expenditure of energy.

One form of the invention is illustrated by way of example in the accompanying drawing, in which Figure 1 is a view of an aircraft wing according to the invention with its extensions moved outwardly and Fig. 2, a detail view.

In the wing construction shown in Fig. 1 the numeral 1 designates a single wing of an aircraft, not shown, and 2 designates a longitudinal spar disposed approximately in the middle of the wing and connecting the members or ribs 3 extending transversely thereto. The ribs 3 possess recesses 4 in front of and in the rear of the spar 2 for accommodating wing extensions 5, 6 which can be moved inwardly and outwardly transversely to the direction of flight. Each of these two extensions or auxiliary wings 5, 6 is capable of resisting bending and twisting and both are rigidly interconnected by a wing tip cap 7 so as to prevent twisting relative to each other, a portion of the torsional forces being taken up by the strong ribs 10 in the front auxiliary wing 5.

The stringers 8 forming part of the static structure of the wing 1 and extending parallel to the spar 2 are provided according to the invention with rollers 9 which are disposed at a short distance from one another and serve for safely bearing and easily guiding the wing extensions 5, 6. To this end, they are arranged above and below the extensions, particularly near the spar 2 and within range of the nose and trailing edge of the wing.

The gap 5a produced when the auxiliary wings 5, 6 are extended is covered on the upper and lower sides of the wing by yielding strips 11 each of which is guided in channels 13 of the extensions 5, 6 and positioned with one end in the cap 7 so as to disappear while the other end is connected to a traction member 12 in the wing 1. The strip 11 can thus be moved at will from the inside of the aircraft or displace itself automatically. To effect automatic displacement it suffices already to secure the end of the strip to the wing 1, and automatic disappearance can be brought about by providing for instance in the cap 7 a winding roll 15 driven by spring, etc. When the extensions 5, 6 are moved in, the cap 7 closely fits the end 14 of the main wing 1.

The invention is of course not restricted to aircraft wings having one main longitudinal spar and two wing extensions or auxiliary wings.

What is claimed is:

In an aircraft wing: a main wing having a central longitudinal spar assembly which extends substantially the length of the wing from the upper surface to the lower surface thereof, said wing also having two recesses to the front and rear respectively of said spar assembly; a wing extension telescopically related to said main wing at the extremity thereof and including, two wing sections positioned respectively in front of and to the rear of said spar assembly and adapted to be moved longitudinally between a position where the respective wing sections are nested within said recesses in said main wing and a position wherein the wing extension forms an extension of said main wing, said wing sections being spaced from each other so as to move upon opposite sides of the longitudinal spar whereby there is a gap between the wing sections when the extensible wing is extended; yielding strip means carried by said wing extensions and adapted to slide over said gap when said wing extension moves to the extended position; a plurality of stringers within said main wing parallel to said spar and respectively above and below said wing sections when said wing sections are nested within said main wing; rollers carried by said stringers to facilitate the longitudinal movements of said wing extensions; and a wing tip cap carried by said wing sections at their extreme ends and forming a cap for the aircraft wing.

RUDOLF KOCH.